3,526,608
**USE OF POLYAMIDES DERIVED FROM IMINODI-
ACETIC ACID AND RELATED COMPOUNDS IN
IMPROVING THE WET AND DRY STRENGTH OF
PAPER**
Rudolph G. Berg, Groton, and Bryce E. Tate, Niantic,
Conn., assignors to Chas. Pfizer & Co., Inc., New York,
N.Y., a corporation of Delaware
No Drawing. Filed Feb. 13, 1968, Ser. No. 704,997
Int. Cl. C08g *20/00;* D21d *3/00;* D21h *3/48*
U.S. Cl. 260—29.2                                10 Claims

ABSTRACT OF THE DISCLOSURE

A polyamide, prepared by reacting either iminodiacetic acid, an ester thereof, or a related compound, with a polyalkylene polyamine, or a mixture thereof, is condensed with epichlorohydrin to provide a water-soluble, cationic, thermosetting resin, which when incorporated into paper products and cured to a water insoluble state, enhances their wet and dry strength.

BACKGROUND OF THE INVENTION

This invention relates to the preparation of a series of water-soluble, thermosetting resins, useful in enhancing the wet and dry strength of paper products. This invention further relates to a process for improving the wet and dry strength of paper products.

In many situations it is desirable to have paper and paper products having a high degree of wet strength. In the past, many approaches have been taken to realize this objective. For example, it has been found that incorporating thermosetting amino-formaldehyde resins in paper and curing the resultant product provides a paper product having improved wet strength properties. One of the disadvantages in using these particular resins is that relatively low pH conditions are needed for curing the paper products. This aspect of the process makes it objectionable as a means for increasing the wet strength of map, bond, and archival grade papers so that they do not deteriorate rapidly with age, since it is well known that curing at a low pH causes paper to undergo acid-promoted decomposition.

Furthermore, the use of acidic solutions accelerates the rate of corrosion of the processing equipment.

Another disadvantage of the amino-formaldehyde resins is their tendency to increase the stiffness of the paper and reduce its water absorbency. Obviously both these features would be undesirable in paper towels and facial tissues. The resins of the present invention do not impart these undesirable characteristics to paper.

It has been previously found that alkaline-curing, wet strength resins can be prepared by cross-linking polyamines with epichlorohydrin. This approach has been further extended by replacing the polyamines with secondary amine-containing polyamides, which are conveniently prepared by reacting saturated dicarboxylic acids with such polyalkylene polyamines as diethylene triamine. The polyamides are reacted with epichlorohydrin, in aqueous solution, to yield water-soluble, cationic thermosetting resins. As indicated above, incorporation of these resins into paper products improves their wet strength.

It appears that the secondary amine groups in the polyamides markedly increase their water solubility, thus making them useful for the preparation of these water-soluble, cationic resins. The resultant cationic resins contain tertiary and/or quaternary ammonium groups, formed by the reaction of the epichlorohydrin with the secondary amine groups contained in the polyalkylene polyamine portion of the polyamide.

The strength of paper is substantially improved by incorporating these water-soluble resins in the paper and then heating or curing the resultant product to insolubilize the resin. Among the saturated dicarboxylic acids previously used to prepare these polyamides are adipic acid and glutaric acid.

The water solubility of polyamides used to prepare these water-soluble, thermosetting resins is of critical importance. If the molecular weight of the polyamide is too high, there is a concomitant decrease in their water-solubility. As a consequence only low molecular weight resins can be obtained from the reaction with epichlorohydrin, which are found to have diminished wet-strength improving properties.

We have now found that one means for avoiding this problem is to prepare polyamides from dicarboxylic acids and esters containing a secondary or tertiary nitrogen in the main carbon chain of the molecule.

It appears that the presence of a secondary or tertiary nitrogen atom in the acid or ester monomer gives a polyamide having improved water solubility. The overall result is that higher molecular weight water-soluble polyamides can be prepared, thus enabling one to prepare improved wet and dry strength resins.

SUMMARY OF THE INVENTION

This invention comprises a process for preparing aqueous solutions of water-soluble thermosetting resins, wherein a polyalkylene polyamine having 2 primary amine groups and containing from 1 to 3 secondary amine groups is reacted with at least an equi-molar amount of a compound having the general formula:

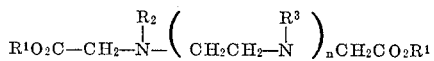

wherein $n$ is 0 or 1 and when $n=0$, $R^1$ and $R^2$ are hydrogen or a lower alkyl having up to 4 carbon atoms; and where $n=1$, $R^1$ is hydrogen or a lower alkyl having up to 4 carbon atoms, and $R^2$ and $R^3$ are each selected from a lower alkyl group having up to 4 carbon atoms or taken together are ethylene; to yield long chain, water-soluble polyamides, which when reacted in aqueous solution with epichlorohydrin provide the desired thermosetting resins.

We have found that the wet and dry strength of paper products can be enhanced by incorporating the water-soluble resins in the paper products and curing the resins to a water-insoluble state.

This invention further broadly comprises a process for improving the wet and dry strength of paper products by incorporatnig therein and curing to a water insoluble state a thermosetting water-soluble resin, wherein the resin is the water-soluble reaction product of a long chain polyamide and epichlorohydrin and when the polyamide is prepared by reacting either iminodiacetic acid, N,N'-piperazinediacetic acid, an N-alkyliminodiacetic acid, an N,N'-dialkylethylenediamine-N,N'-diacetic acid, or their corresponding esters, with a polyamine containing at least two primary amine groups and from 1 to 3 secondary amine groups.

It is a further object of this invention to provide a process for improving the wet and dry strength of paper which comprises the steps of: preparing a polyamide from the reaction of either iminodiacetic acid, N,N'-piperazine-diacetic acid, an N-alkyliminodiacetic acid, an N,N'-dialkylethylenediamine-N,N'-diacetic acid, or their corresponding esters, and one or more polyalkylene polyamines; condensing the resultant polyamide with epichlorohydrin to give a water-soluble thermosetting resin; incorporating the water-soluble resin into paper products; and curing the incorporated resin to a water insoluble state.

DETAILED DESCRIPTION OF THE INVENTION

The polyamides of the present invention are obtained from the reaction of polyalkylene polyamines, such as diethylene triamine, and either iminodiacetic acid, N,N'-piperazinediacetic acid, N-alkyliminodacetic acids, N,N'-dialkylethylenediamine-N,N'-diacetic acids, or their corresponding lower alkyl esters.

Of the numerous polyalkylene polyamines that may be used we prefer diethylene triamine, triethylene tetramine, and tetraethylene pentamine. We have also found that mixtures of these polyamines can be used. Although we prefer to use unbranched polyamines, it is also possible to employ polyamines containing branched alkyl chains. Iminodiacetic acid, N,N'-piperazinediacetic acid, the N-alkyliminodiacetic acids and their corresponding esters have been reported in the literature and can be prepared by conventional synthetic techniques well known to those skilled in the art.

We have found that the N,N'-dialkylethylenediamine-N,N'-diacetic acids can be conveniently prepared via a Mannich reaction, from the corresponding N,N'-dialkylethylenediamine, formaldehyde, and a cyanide salt. We usually add separate aqueous solutions of the cyanide salt, usually potassium or sodium cyanide, and formaldehyde to an alkaline, aqueous solution of the N,N'-dialkylethylenediamine, which is stirred and heated during the additions. Heating is continued until the evolution of ammonia ceases. The mixture is cooled, the solution acidified, and the N,N'-dialkylethylenediamine-N,N'-diacetic acid is separated, usually as the dihydrate.

The reaction between the acid or ester monomer and the polyalkylene polyamine is generally carried out in the absence of a solvent at a temperature between 100° and 200° C. A temperature range of 100-150° C. is preferred when using the ester monomers while in the case of the acid monomers the preferred range is about 140-200° C.

The optimum reaction conditions are dependent upon the particular reactants and can be readily determined by routine experimentation. Usually, however, when water or alcohol cease to appear as distillate upon continued heating of the reactants, one can assume that there has been complete reaction.

While in theory 1 mole of the ester or acid monomer will react with 1 mole of the polyamine to form a polyamide, it may be preferable in some situations to employ a slight excess of polyamine, e.g., 10% to insure complete reaction.

After the polyamide has formed, it is removed from the flask and allowed to solidify. It is then reacted in an aqueous solution with epichlorohydrin to yield the water-soluble thermosetting resin. At the minimum, enough epichlorohydrin is used to convert all the secondary amine groups in the polyamine portion of the polyamide to tertiary ammonium groups. It is also possible to use enough epichlorohydrin to quaternarize these secondary amine groups, in which case 2 moles of epichlorohydrin are added for each secondary amine group in the polyalkylene polyamine portion of the polyamide.

In converting the water-soluble polyamide to the cationic, thermosetting resin with epichlorohydrin, we generally heat the two reactants together in water at 40-100° C. During the condensation of the polyamide with epichlorohydrin, the pH of the solution is maintained between 5 and 9 with the preferred range being 6 to 8.

The resultant solution is cooled, diluted with sufficient water to provide the desired concentration and the pH of the solution is adjusted anywhere from 5 to 9, with the intermediate values being preferred.

Paper products are then treated with this solution by dipping them directly into it (tub-sizing). Alternatively, such solutions may be incorporated into the paper making system, i.e., into the pulp slurry.

After a paper is treated with the resin solution, it is dried and heated or cured at 90° C. for 10 minutes to insolubilize the incorporated resin. This feature is not critical, since the resins of the instant invention will even cure at temperatures as low as 25° C., albeit a longer curing time will be required. Even temperatures as high as 150° C. can be used for curing. In any event, we have found that the resins of the present invention characteristically cure more rapidly than most of the wet strength resins previously described in the prior art.

Up to about 5% by weight of the polyamide-epichlorohydrin resin may be generally incorporated into the paper product, with amounts under 2–3% add-on being sufficient for most purposes. As little as 0.1% add-on will provide significant increases in the wet and dry strength of the treated paper.

The following examples are given to further illustrate the present invention, but are not to be construed as limiting the scope thereof.

EXAMPLE I (A) Preparation of polyamide from N-methyliminodiacetic acid

To a 1 liter, 3-necked, round-bottom flask, fitted with a mechanical stirrer, immersion thermometer, nitrogen inlet, and a short bath distillation head attached to a receiver, is added 351.5 g. (3.40 mloes) of diethylene triamine and 500 g. (3.40 moles) of N-methyliminodiacetic acid. The system is flushed with nitrogen and the major portion of the flask is immersed in an oil bath, which is heated to about 140–150° C. The reactants are stirred and heated at this temperature for about 30 hours. At the end of this time the distillation of water has stopped and the mixture has become very viscous. The polyamide is removed from the flask and allowed to solidify. The yield of polyamide is 561 g.

(B) Preparation of thermosetting resin

An aqueous solution containing 11% of the polyamide is prepared by stirring the appropriate amount of resin in water for 50 minutes at room temperature.

The solution is then heated in a water bath until its temperature is about 50° C. At this point sufficient epichlorohydrin is added to provide a ratio of 1 mole of epichlorohydrin for every unit of polyamide, i.e.

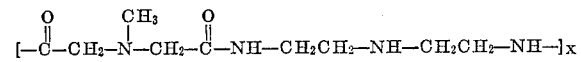

This amount of epichlorohydrin, when added to the aqueous solution of the resin, provides a 15% total solids solution by weight.

The resultant solution is heated at about 60–65° C. for 1 hour. At this temperature the solution is slightly viscous. Upon cooling it to room temperature, it becomes very viscous and is almost a semi-gel. After stirring it overnight, the mixture is further diluted to provide a total solids content of 0.8%. The pH of the resultant solution is 6.85. The pH is then adjusted to 7.35. The solution is still somewhat viscous at this concentration.

E & D No. 613 paper is tub-sized with the solution and cured at 95° C. for 10 minutes. The paper has a wet strength of 48% of its dry strength.

EXAMPLE II

The procedure of Example I–A is repeated replacing the N-methyldiminodiacetic acid with an equivalent amount of one of the acids below:

N-ethyliminodiacetic acid
N-n-butyliminodiacetic acid
iminodiacetic acid
N,N'-piperazinediacetic acid The resulting polyamides are reacted with epichlorohydrin in the manner indicated in Example I–B to provide thermosetting, water-soluble resins.

When these resins are incorporated in paper products, their wet and dry strength is enhanced.

EXAMPLE III

(A) Preparation of polyamide from dimethyl-N-methyliminodiacetate

To a 25 ml., 3-necked, round-bottom flask, fitted with a mechanical stirrer, thermometer, nitrogen inlet, and condenser, is added 3.50 g. (0.020 mole) of dimethyl N-methyliminodiacetate and 2.06 g. (0.020 mole) of diethylene triamine. The reactants are heated in an oil bath which is at a temperature from about 90–115° C. over a period of about 2½ hours. The temperature of the oil bath is then slowly raised from 120 to 154° C. over a period of 5 hours. At the end of this time the contents of the flask are very viscous. The polyamide is removed from the flask and allowed to solidify.

When appropriately higher reaction temperatures are employed, substantially the same results are obtained when the following esters are used instead of dimethyl N-methyliminodiacetate:

diethyl N-methyliminodiacetate
di-n-propyl N-methyliminodiacetate
di-n-butyl N-methyliminodiacetate

(B) Preparation of the thermosetting resin

An 11% aqueous solution of the polyamide is prepared at room temperature. The resultant solution is then heated in a water bath which is set at about 65° C. The pH of the solution is about 10.4. Sufficient epichlorohydrin is added to provide 1 mole of epichlorohydrin for each unit of the polyamide (see Example I part B). This amount of epichlorohydrin gives a solids content of about 15%. The pH quickly falls to about 8.6. The mixture is kept in the water bath for about 1 hour, after which time the pH is about 7.5.

A portion of this solution is taken and the solids content is adjusted to about 0.8%, at which concentration the resultant pH is about 6.4. The pH is adjusted to 6.7 and E & D No. 613 paper is tub-sized with this solution and cured at 95° C. for 10 minutes. The wet strength is about 38.4% of the dry strength of the paper.

EXAMPLE IV

The procedure of Example III–A is repeated replacing the dimethyl N-methyliminodiacetate wtih an equivalent amount of one of the esters below:

dimethyl N-ethyliminodiacetate
diethyl N-n-butyliminodiacetate
dimethyl iminodiacetate
diethyl N,N'-piperazinediacetate The resulting polyamides are reacted with epichlorohydrin in the manner indicated in Example III–B to provide thermosetting, water-soluble resins.

When these resins are incorporated in paper products, their wet and dry strength is enhanced.

EXAMPLE V

(A) Preparation of N,N-dimethylethylenediamine-N,N'-diacetic acid

Into a 1 liter, 3-necked flask equipped with 2 dropping funnels, an immersion thermometer, and a reflux condenser, is added 50 g. (0.568 mole) of N,N'-dimethylethylenediamine, 106 ml. of water, and 9.2 g. of sodium hydroxide. After solution is complete, 37 ml. of a 30% sodium cyanide solution (0.227 mole) is added.

One of the dropping funnels is charged with 37% formaldehyde solution and the other with a 30% solution of sodium cyanide. The flask is heated in an oil bath to about 60° C., and 16 ml. of the formaldehyde solution is added (0.225 mole). The mixture is stirred magnetically and heated to about 97° C. Refluxing begins and ammonia begins to evolve. The temperature is raised to about 100° C. During this increase in temperature there is a continuous evolution of ammonia.

Over the course of the next 3 hours there are simultaneous additions of 17 ml. of the formaldehyde solution (0.225 mole) and 37 ml. of the cyanide solution at the end of each hour of heating. During this time there is a continuous evolution of ammonia. After the last addition, one more addition of each of the above reagents, in the same amount, is made at the end of another 1½ hours of heating. After one more hour, an additional 4 ml. of the formaldehyde solution is added, and the mixture is refluxed an additional 16–17 hours.

Nitrogen is passed through the reaction mixture to displace the residual traces of ammonia, and the mixture is cooled to room temperature and acidified to a pH of about 4.2 with 120 ml. of concentrated hydrochloric acid.

The acidified mixture is filtered, and the filtrate concentrated under vacuum by means of a rotary evaporator to a syrup. Methanol is added and the mixture stirred and heated on a steam bath. The precipitated sodium chloride is filtered, and the filtrate is cooled in an ice bath. Crystals of N,N'-dimethylethylene-N,N'-diacetic acid dihydrate separate and are filtered. After drying the crystals in a vacuum oven at 55° C., the yield is 96.7 g. (71%); M.P. sintering at 214° C., melts at 215–218° C. The acid dihydrate (70 g.) is recrystallized from water and dried in a vacuum oven at 130° C., to provide 45.7 g. of the anhydrous acid (77% recovery); M.P. 219–222° C.

Analysis.—Calc'd for $C_8H_{16}N_2O_4$ (percent): C, 47.05; H, 7.90; N, 13.72. Found (percent): C, 47.14; H, 7.72; N, 13.82. Neutralization equivalent: Calc'd. 102.1. Found: 104.5.

(B) Preparation of polyamide from N,N-dimethylethylenediamine-N,N'-diacetic acid To a 25 ml., 3-necked, round-bottom flask, fitted with a mechanical stirrer, thermometer, nitrogen inlet, and condenser is added 8.17 g. (0.040 mole) of N,N'-dimethylethylenediamine-N,N'-diacetic acid and 4.12 g. (0.040 mole) of diethylene triamine. The apparatus is flushed with nitrogen and the mixture is heated with an oil bath. Over a period of an hour the temperature of the oil bath is raised to 120° C., whereupon the mixture begins to become homogenous. The heating is continued at about 180° C. for 4 hours, during which time the water formed in the reaction continuously distills from the reaction flask. The temperature is then raised to 185–200° C., and the mixture is maintained at that temperature for 4½ hours.

The polyamide is removed from the flask, cooled and allowed to solidify.

(C) Preparation of the thermosetting resin 1.63 g. (0.006 mole) of the polyamide prepared in B is dissolved in 14.4 ml. of water. The solution is heated in a water bath to about 65° C. and 0.56 g. (0.006 mole) of epichlorohydrin is added. The mixture is stirred at about 65° C. for one hour whereupon the pH falls to about 8.4. The solids content of the solution is about 13%. Sufficient water is added to the mixture to adjust the solids content to about 0.8%. The pH of the resultant solution is about 7.3.

E & D No. 613 paper is tub sized with this solution and cured at 95–100° C. for 10 minutes. The wet strength of the paper is about 21–22% of its dry strength.

EXAMPLE VI (A) Using the procedure of Example V–A, the N,N'-dialkylethylenediamine-N,N'-diacetic acids below are prepared from the corresponding N,N-dialkylethylenediamines.

N,N'-diethylethylenediamine-N,N'-diacetic acid
N,N'-di-n-propylethylenediamine-N,N'-diacetic acid
N,N'-di-n-butylethylenediamine-N,N'-diacetic acid (B) Using the procedure of Example V–B, the N,N'-dialkylethylenediamine-N,N'-diacetic acids prepared in part A above are reacted with diethylene triamine to give the respective polyamides.

(C) The polyamides in part B are reacted with epichlorohydrin in the manner indicated in Example V–C to provide thermosetting, water-soluble resins.

When these resins are incorporated in paper products, their wet and dry strength is enhanced.

EXAMPLE VII

The dialkyl N,N' - dialkylethylenediamine-N,N'-diacetates listed below are reacted with diethylene triamine according to the procedure of III–A.

dimethyl N,N'-dimethylethyleneamine-N,N'-diacetate
dimethyl N,N'-diethylethylenediamine-N,N'-diacetate
diethyl N,N'-di-n-propylethylenediamine-N,N'-diacetate The resulting polyamides are reacted with epichlorohydrin according to the procedure of Example III–B to provide thermosetting, water-soluble resins.

When these resins are incorporated in paper products, their wet and dry strength is enhanced.

EXAMPLE VIII

The procedures of Example I to VII are repeated, with the exception that the diethylene triamine is replaced with an equivalent amount of the polyalkylene polyamines listed below, which are used either singly or are used as mixtures having the indicated proportions.

(A) triethylene tetramine
(B) tetraethylene pentamine
(C) 1 part triethylene tetramine and 1 part tetraethylene pentamine
(D) 1 part diethylene triamine and 1 part triethylene tetramine
(E) 1 part diethylene triamine and 1 part tetraethylene pentamine
(F) 2 parts diethylene triamine, 1 part triethylene tetramine and 1 part tetraethylene pentamine.

The resultant polyamides are reacted with epichlorohydrin as described in the examples above, to provide thermosetting, water-soluble resins.

The wet and dry strength of paper products is enhanced when these resins are incorporated in them.

EXAMPLE IX

Bleached Coniferous Kraft Pulp is beaten in a 1½ pound Valley Beater (Allis-Chalmers, Milwaukee, Wis.). Each charge consists of 380 g. of absolutely dry pulp, dispersed in 23 liters of water and is beaten 30 minutes with a full load on the bed plate lever arm. The freeness of the blend is 411 ml. at a pad weight of 3.00. The resultant paper pulp stock is used in the manner indicated below to prepare paper sheets.

Sets of paper sheets are made on a Noble and Wood paper sheet machine. Each set consists of six sheets. A sufficient amount of the paper pulp stock mixture prepared above is added to the tank of the paper-making machine and adjusted to the proper consistency.

Meanwhile sufficient water is added to the 15% total solids resin solution of Example III–B to provide a total solids content of 5%.

Each set of the paper sheets is prepared by adding enough of the paper pulp stock prepared above to the proportioning tank of the paper sheet machine to provide 23.65 g. of pulp calculated on a dry basis.

The 5% total solids resin solution prepared above is then added in the amounts indicated in Table I, and the pH of the resultant mixture is adjusted to 7.0.

The 6 sheets are pressed on a wire and dried for 2 minutes at about 105° C. The wet strength of the paper sheets is determined on an Instron Tensile Strength Instrument, available from the Instron Engineering Corporation, 2500 Washington St., Canton, Mass. Before making the tests, the paper sheets are kept overnight in an atmosphere having a relative humidity of 60–68%, and the wet strengths are determined at this relative humidity.

The settings on the Instron Instrument are set as follows:
Distance between heads: 4 inches.
Chart speed : 0.2 inch per minute at a crosshead speed of 0.5 inch per minute.

The results are given in Table I.

TABLE I

| Set | Ml. of 5% T.S.[1] resin solution | Percent of resin in each sheet | Average tensile strength, gms. Dry | Average tensile strength, gms. Wet | Percent wet[2] strength |
|---|---|---|---|---|---|
| Blank | 0 | 0 | 4,686 | 168 | |
| 1 | 10.00 | ca. 2 | 5,800 | 1,418 | 30 |
| 2 | 5.00 | ca. 1 | 6,416 | 1,330 | 28 |
| 3 | 2.50 | ca. 0.5 | 5,490 | 938 | 20 |
| 4 | 1.25 | ca. 0.25 | 5,582 | 736 | 16 |

[1] T.S.—Total solids
[2] Percent wet strength—Tensile strength of wet resin-treated paper ÷ the tensile strength of dry untreated paper.

Essentially the same results are obtained when the paper sheets are prepared with the resin of Example I–B.

EXAMPLE X

When paper sheets are prepared and tested according to the procedure of Example IV, using the resins described in Examples I to VIII, it is found that their wet and dry strength is considerably enhanced.

What we claim is:

1. A process for preparing an aqueous solution of a water-soluble thermosetting resin which comprises:
    (a) reacting a polyalkylene polyamine having 2 primary amine groups and containing from 1 to 3 secondary amine groups with at least an equi-molar amount of a compound having the general formula:

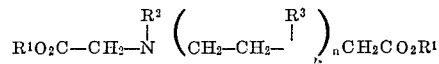

wherein $n$ is 0 and 1 and where $n$ is 0, $R^1$ and $R^2$ are hydrogen or a lower alkyl having up to 4 carbon atoms; and where $n$ is 1, $R^1$ is hydrogen or a lower alkyl having up to 4 carbon atoms, and $R^2$ and $R^3$ are each selected from a lower alkyl group having up to 4 carbon atoms or taken together are ethylene; to form a long chain, water-soluble polyamide, and
    (b) reacting an aqueous solution of said polyamide with epichlorohydrin to form an aqueous solution of a thermosetting resin.

2. The process of claim 1 wherein said polyamide is prepared by the reaction of said polyamine with iminodiacetic acid or a lower alkyl ester thereof.

3. The process of claim 1 wherein said polyamide is prepared by the reaction of said polyamine with N-methyliminodiacetic acid or a lower alkyl ester thereof.

4. The process of claim 1 wherein said polyalkylene polyamine is selected from the group consisting of diethylene triamine, triethylene tetramine and tetraethylene pentamine and mixtures thereof.

5. A process for preparing an aqueous solution of a water-soluble thermosetting resin which comprises the steps of:
    (a) reacting iminodiacetic acid or a lower alkyl ester thereof with about an equimolar amount of a polyalkylene polyamine having two primary amine groups and containing from 1 to 3 secondary amine groups at a temperature of from about 110° C. to 190° C. to form a polyamide;
    (b) reacting an aqueous solution of said polyamide with epichlorohydrin at a temperature of from about 25° C. to 95° C. and at a mole ratio of epichlorohydrin to secondary amine groups in the polyamine portion of said polyamide of up to 3 to 1, respectively, to provide an aqueous solution of a water-soluble, thermosetting resin.

6. A process for preparing an aqueous solution of a water-soluble thermosetting resin which comprises the steps:
(a) reacting N-methyliminodiacetic acid or a lower alkyl ester thereof with about an equimolar amount of a polyamine having two primary amine groups and containing from 1 to 3 secondary amine groups at a temperature of from about 110° C. to 190° C. to form a polyamide;
(b) reacting an aqueous solution of said polyamide with epichlorohydrin at a temperature of from about 25° C. to 95° C. and at a mole ratio of epichlorohydrin to secondary amine groups of said polyamide of up to 3 to 1, respectively, to provide an aqueous solution of a water-soluble, thermosetting resin.

7. The product of the process of claim 1.
8. The product of the process of claim 5.
9. The product of the process of claim 6.
10. A process for improving the wet and dry strength of paper which comprises incorporating therein the resin of claim 1 in sufficient amount to provide up to about 5% by weight of the thermosetting resin content of said product, and heating the resin-containing paper to cure the resin to a water-insoluble state.

References Cited

UNITED STATES PATENTS

| | | | |
|---|---|---|---|
| 2,961,347 | 11/1960 | Floyd | 260—29.2 |
| 3,240,761 | 3/1966 | Keim et al. | 260—29.2 |
| 3,352,833 | 11/1967 | Earle | 260—78 |

JULIUS FROME, Primary Examiner

A. H. KOECKERT, Assistant Examiner

U.S. Cl. X.R.

117—155; 162—164; 260—78